(12) United States Patent
Leidefeldt

(10) Patent No.: US 10,969,046 B2
(45) Date of Patent: Apr. 6, 2021

(54) GAS VENTING PIPE

(71) Applicant: Volvo Truck Corporation, Gothenburg (SE)

(72) Inventor: Marcus Leidefeldt, Gothenburg (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 224 days.

(21) Appl. No.: 16/308,273

(22) PCT Filed: Jun. 9, 2016

(86) PCT No.: PCT/EP2016/063110
§ 371 (c)(1),
(2) Date: Dec. 7, 2018

(87) PCT Pub. No.: WO2017/211416
PCT Pub. Date: Dec. 14, 2017

(65) Prior Publication Data
US 2019/0257453 A1 Aug. 22, 2019

(51) Int. Cl.
*F16L 37/00* (2006.01)
*B60K 15/01* (2006.01)
(Continued)

(52) U.S. Cl.
CPC .......... *F16L 37/004* (2013.01); *B60K 15/013* (2013.01); *B60K 15/035* (2013.01);
(Continued)

(58) Field of Classification Search
CPC ...... F16L 37/004; F16L 55/07; B60K 15/013; B60K 15/035; B60K 2015/03528;
(Continued)

(56) References Cited

U.S. PATENT DOCUMENTS

| 412,058 A | 10/1889 | Young |
| 2,793,057 A | 5/1957 | McGugin |

(Continued)

FOREIGN PATENT DOCUMENTS

| CN | 203395500 U | 1/2014 |
| EP | 1391599 A1 | 2/2004 |

(Continued)

OTHER PUBLICATIONS

International Search Report and Written Opinion for PCT/EP2016/063110, dated Mar. 9, 2017, 12 pages.

(Continued)

*Primary Examiner* — Paul N Dickson
*Assistant Examiner* — Joselynn Y Sliteris
(74) *Attorney, Agent, or Firm* — Withrow & Terranova PLLC

(57) ABSTRACT

The invention relates to a gas venting pipe (10) for a vehicle (100) having a forward tiltable cab, which gas venting pipe comprises: a first pipe section (12) mountable to a chassis of the vehicle; a second pipe section (14) mountable to a rear wall of the forward tiltable cab of the vehicle; and a flexible magnet connection (16) adapted to releasably interconnect the first and second pipe sections. The present invention also relates to a liquefied gas driven vehicle (100) comprising a gas venting pipe, and to a method of venting gas from a liquefied gas driven vehicle.

14 Claims, 4 Drawing Sheets

(51) Int. Cl.
*B60K 15/035* (2006.01)
*B62D 33/067* (2006.01)
*F16L 55/07* (2006.01)

(52) U.S. Cl.
CPC ............ *B62D 33/067* (2013.01); *F16L 55/07* (2013.01); *B60K 2015/03528* (2013.01); *B60Y 2200/14* (2013.01); *B60Y 2200/145* (2013.01)

(58) Field of Classification Search
CPC .............. B62D 33/067; B60Y 2200/14; B60Y 2200/145; F17C 2205/0332; F17C 2205/0352; F17C 2201/056; F17C 2205/0364; F17C 13/12; F17C 13/005; F17C 2221/033; F17C 2221/035; F17C 2223/0161; F17C 2223/0153; F17C 2223/033; F17C 2260/031; F17C 2265/031; F17C 2270/0171; F17C 7/04

See application file for complete search history.

(56) References Cited

U.S. PATENT DOCUMENTS

| | | |
|---|---|---|
| 3,151,695 A | 10/1964 | Mintz |
| 3,181,895 A | 5/1965 | Cator |
| 4,049,295 A | 9/1977 | Piers |
| 9,243,734 B2 * | 1/2016 | Aubert .................. B08B 15/002 |
| 2010/0066082 A1 | 3/2010 | Aubert et al. |
| 2011/0084474 A1 | 4/2011 | Paden et al. |
| 2020/0116284 A1 * | 4/2020 | Ashida .................. F16L 37/004 |

FOREIGN PATENT DOCUMENTS

| | | | |
|---|---|---|---|
| GB | 2037239 A | 7/1980 | |
| WO | WO-2018048335 A1 * | 3/2018 | .............. F17C 13/12 |
| WO | WO-2018117927 A1 * | 6/2018 | ............ F17C 13/005 |
| WO | WO-2020076209 A1 * | 4/2020 | ........... B60K 15/035 |
| WO | WO-2020076210 A1 * | 4/2020 | ........... B62D 33/067 |

OTHER PUBLICATIONS

International Preliminary Report on Patentability for PCT/EP2016/063110, dated Jun. 11, 2018, 8 pages.

* cited by examiner

GAS VENTING PIPE

This application is a 35 USC 371 National Phase filing of International Application No. PCT/EP2016/063110, filed Jun. 9, 2016, the disclosure of which is incorporated herein by reference in its entirety.

TECHNICAL FIELD

The invention relates to a gas venting pipe for a vehicle having a forward tiltable cab. The present invention also relates to a liquefied gas driven vehicle comprising a gas venting pipe. The present invention also relates to a method of venting gas from a liquefied gas driven vehicle. The invention can be applied in heavy-duty vehicles, such as trucks.

BACKGROUND

A truck that is driven on liquefied natural gas (LNG) can use diesel or spark plugs to ignite the fuel/air mixture. An example of the former is Volvo FM MethaneDiesel. On such a gas vehicle, for example, it is needed to take care of left over gas. There may for example be one pipe going from the engine and one from the LNG tank. The venting line from the engine is normally used to let gas residues to escape out from the engine during failures or when the engine is turned off. The venting line from the LNG tank is normally used to allow vapour from the LNG to escape the tank, which vapour may be caused by added heat. This may also be referred to as boil off. The two pipes are conventionally mounted to a high stand-alone steel structure that is chassis mounted, to let the gas escape high above the ground and out of harm's way from humans. The pipes are routed to at least 1.8 m above the chassis frame. However, such a stand-alone steel structure takes up space on the chassis and limits the bodybuilder interface, and the loading compartment will be about 100 mm shorter.

SUMMARY

An object of the invention is to provide an improved gas venting pipe, which may overcome or at least alleviate at least some of the aforementioned drawbacks.

According to a first aspect of the invention, the object is achieved by a gas venting pipe according to claim 1.

According to the first aspect, there is provided a gas venting pipe for a vehicle having a forward tiltable cab, which gas venting pipe comprises: a first pipe section mountable to a chassis of the vehicle; a second pipe section mountable to a rear wall of the forward tiltable cab of the vehicle; and a flexible magnet connection adapted to releasably interconnect the first and second pipe sections, wherein the flexible magnet connection comprises a male end part joined with the first pipe section via a flexible pipe portion, a female end part attached to or integrally formed with the second pipe section, in which female end part the male end part at least partly fits, and magnetic means for holding the first and second pipe sections together.

When implemented on a vehicle having a forward tiltable cab, the first and second sections of the present gas venting pipe are normally connected with each other and vertically arranged when the cab is not tilted. But when the cab is tilted, the connection is constructed so that the first and second pipe sections automatically disconnect from each other.

Instead of having a stand-alone steel structure, the present gas venting pipe can at least partly be mounted on the cab rear wall. Without the need of a stand-alone structure, the number of parts is reduced and the total weight is decreased. Also the stand-alone structure uses up a part of the chassis frame that otherwise could be used for body work and carrying goods. With the cab rear wall mounted gas venting pipe this space can now be used for something more useful for the truck owner because of the increased possible loading space on the chassis frame.

Another advantage is the accessible split in the gas venting pipe at the flexible magnet connection. During maintenance it could be a wanted feature to be able to fit a gas suction device on the end of the gas venting pipe in order to not get gas in the workshop. If there was no split in the gas venting pipe this gas suction device would have been place on top of the cab. When the split in the gas venting pipe is between the chassis (frame) and the cab it is much more ergonomic for the maintenance personal to connect the gas suction device. The flexible magnet connection may be located out on the side of the vehicle, close to cab side air deflectors, waist high.

Furthermore, since the connection comprises a flexible pipe portion situated between the first pipe section and the male end part, is possible to disconnect the gas venting pipe even when the cab is not tilted. For example when doing maintenance on the rear axle the cab might not be tilted, but gas can still be vented and there is therefore a need to connect a gas suction device. Then it is easy to pull the flexible pipe portion, whereby the flexible magnet connection disconnects. The flexible pipe portion situated between the first pipe section and the male end part also makes it possible to orient the pipe to fit better with the gas suction device. Furthermore, the flexible pipe portion may make the present gas venting pipe able to cope with tolerances and movement relative the chassis and cab.

The first pipe section may be rigid. Hence, the flexible pipe portion between the first pipe section and the male end part is more flexible and bendable than the first pipe section. The flexible pipe portion may for example comprise a tube of braided steel wires. This makes the present gas venting pipe very suitable for implementation in a liquefied gas driven vehicle, since the flexible pipe portion then can cope with the low temperatures associated with such a fuel without degraded performance. The flexible pipe portion could alternatively be made of a plastic material with low permeability that can cope with low temperatures without becoming brittle.

It should be noted that U.S. Pat. No. 3,151,695 discloses a releasable connection for a tilting cab vehicle, but the connection in U.S. Pat. No. 3,151,695 comprises a bellows-like flexible member which is made of rubber or plastics, and such materials are not suitable for the low temperatures of liquefied gas such as LNG. Also, the connection in U.S. Pat. No. 3,151,695 is used for air intake, not for venting gas out from a vehicle.

The female end part can be cone-shaped and have a mouth which is wider than the male end part. This may facilitate the docking, i.e. coupling the male end part to the female end part. It may also allow the connection to be free from gas leakage. As the vented gas is lighter than air it will raise, therefore the female end part may be bigger and cone-shaped.

The male and female end parts may each have an inner conduit, wherein the diameter of the inner conduit of the female end part is greater than the diameter of the inner conduit of the male end part. In this way the flexible magnet connection will not risk of separating if struck by high pressure gas, since the inner diameter change with reduce the pressure.

According to a second aspect, there is provided a liquefied gas driven vehicle, comprising: an engine; a fuel tank adapted to contain liquefied gas; a chassis; a forward tiltable cab pivotally mounted to the chassis, the cab having a rear wall; and a gas venting pipe in fluid communication with at least one of the engine and the fuel tank, the gas venting pipe being adapted to vent left over gas from at least one of the engine and the fuel tank to the ambient, wherein the gas venting pipe comprises a first pipe section mounted to the chassis, a second pipe section mounted to the rear wall of the forward tiltable cab, and a flexible magnet connection adapted to releasably interconnect the first and second pipe sections. This aspect may exhibit the same or similar features and technical effects as the first aspect, and vice versa.

For example, the flexible magnet connection may comprise a male end part joined with the first pipe section via a flexible pipe portion, a female end part attached to or integrally formed with the second pipe section, in which female end part the male end part at least partly fits, and magnetic means for holding the first and second pipe sections together.

Furthermore, the gas venting pipe may be in fluid communication with both the engine and the fuel tank via a branching provided between said connection and the engine and fuel tank. Hence, only one pipe is required for gas venting.

Alternatively, the gas venting pipe may be in fluid communication with the engine, wherein the vehicle further comprises another gas venting pipe in fluid communication with the fuel tank. The another gas venting pipe may be of the same type as described above, i.e. for example comprising a first pipe section mounted to the chassis, a second pipe section mounted to the rear wall of the forward tiltable cab, and a flexible magnet connection adapted to releasably interconnect the first and second pipe sections.

According to a third aspect, there is provided a method of venting gas from a liquefied gas driven vehicle having a forward tiltable cab, which method comprises: providing a gas venting pipe in fluid communication with at least one of an engine and a fuel tank of the vehicle, wherein the gas venting pipe comprises a first pipe section mounted to a chassis of the vehicle, a second pipe section mounted to a rear wall of the forward tiltable cab, and a flexible magnet connection adapted to releasably interconnect the first and second pipe sections; and venting gas from at least one of the engine and the fuel tank to the ambient via the gas venting pipe. This aspect may exhibit the same or similar features and technical effects as the first and/or second aspect(s), and vice versa.

For example, the flexible magnet connection may comprise a male end part joined with the first pipe section via a flexible pipe portion, a female end part attached to or integrally formed with the second pipe section, in which female end part the male end part at least partly fits, and magnetic means for holding the first and second pipe sections together.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings:

FIG. 1b is a partial cross-sectional perspective view of the gas venting pipe of FIG. 1a.

DETAILED DESCRIPTION OF EXAMPLE EMBODIMENTS OF THE INVENTION

Figure 1A:
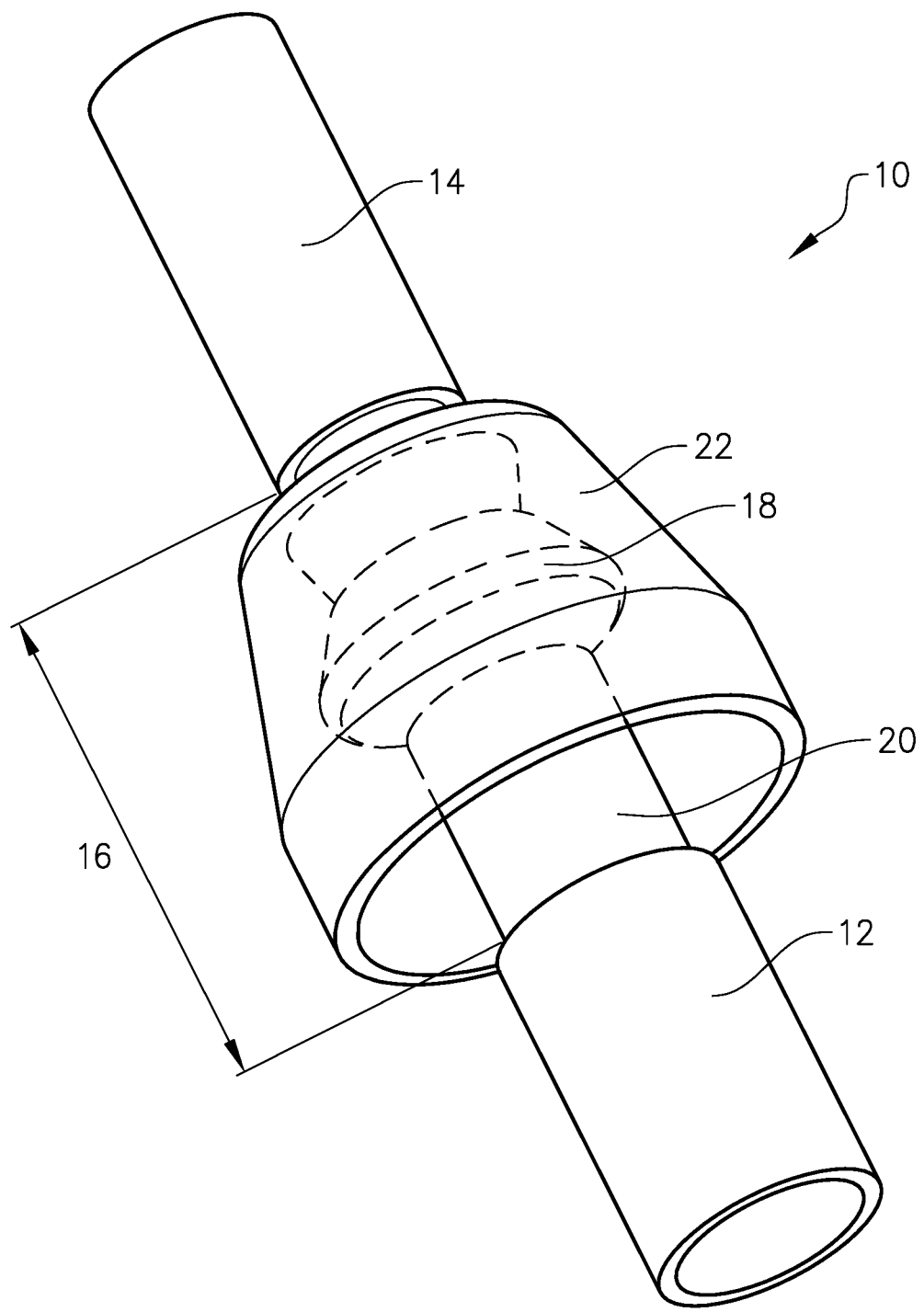
FIG. 1a is a partial perspective view of a gas venting pipe according to an embodiment of the present invention in a connected state.
Figure 1B:
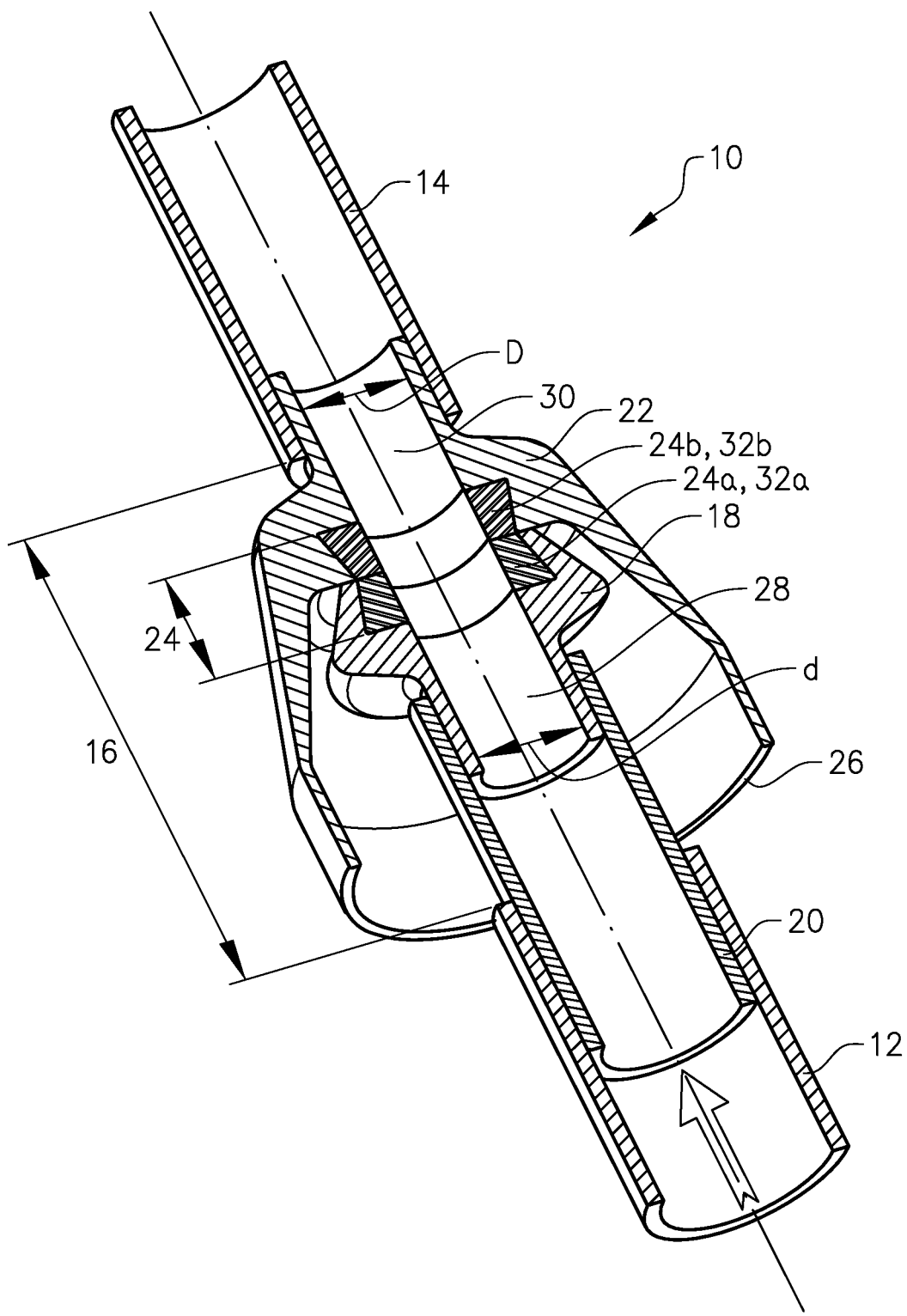
Figure 2:
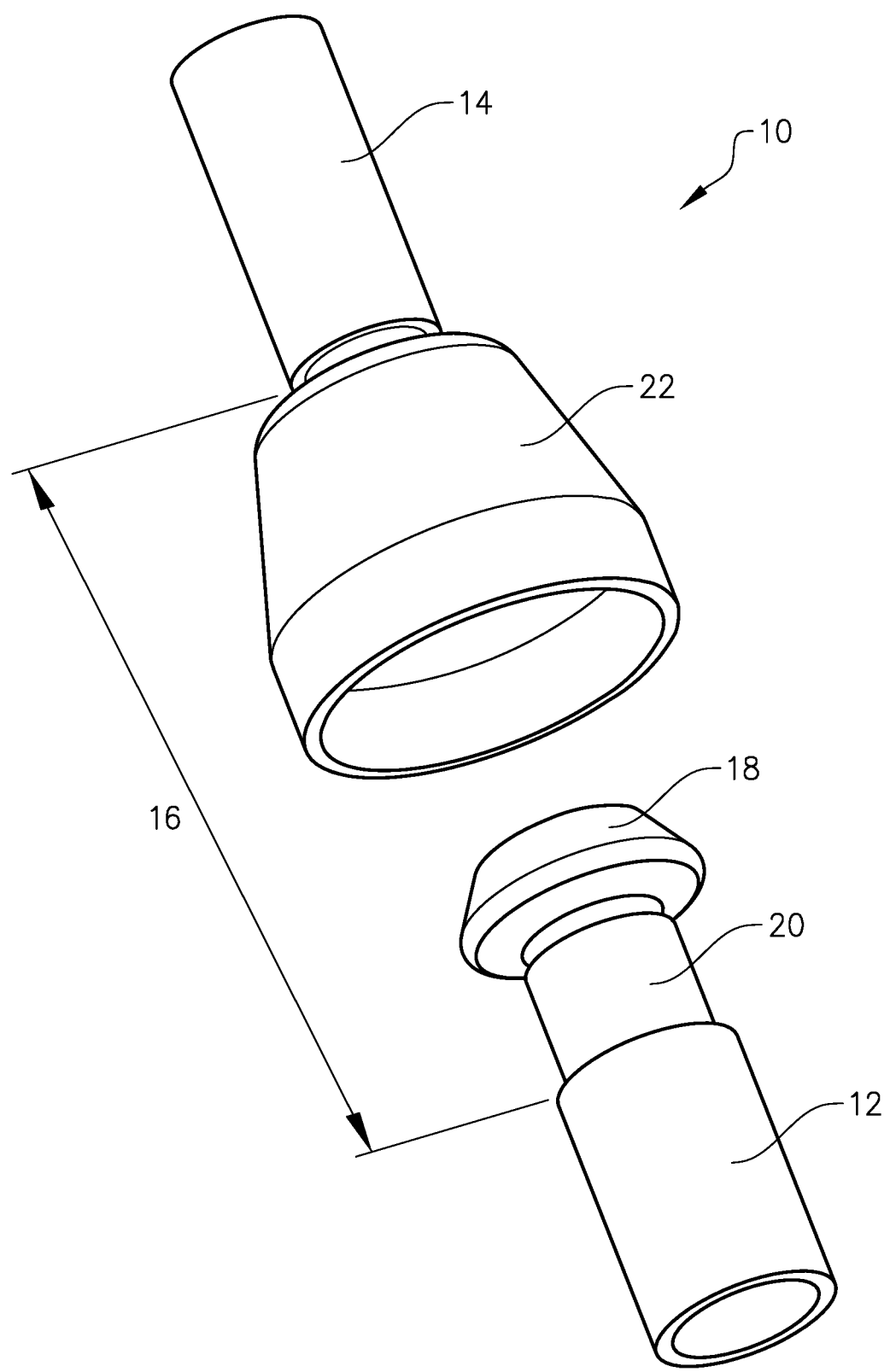
FIG. 2 is a partial perspective view of the gas venting pipe of FIGS. 1a-1b, but in a disconnected state.

FIGS. 1a-1b and 2 illustrate a gas venting pipe 10 according to an embodiment of the present invention. The pipe 10 may also be referred to as a gas vent pipe.

The gas venting pipe 10 comprises a first pipe section 12, a second pipe section 14, and a flexible magnet connection 16 adapted to releasably connect the first and second pipe sections 12, 14 with each other.

The first pipe section 12 is typically rigid. The first pipe section 12 can for example be made of stainless steel. The first pipe section 12 may have a circular cross-section.

The second pipe section 14 may be rigid. The second pipe section 14 may be straight or substantially straight. The second pipe section 14 can for example be made of stainless steel. The second pipe section 14 may have a circular cross-section.

The flexible magnet connection 16 is generally situated between the first pipe section 12 and the second pipe section 14. The flexible magnet connection 16 may be rotationally symmetrical. The flexible magnet connection 16 comprises a male end part 18, a flexible pipe portion 20, a female end part 22 in which the male end part 18 at least partly fits, and magnetic means 24 for holding the first and second pipe sections 12, 14 together (hence the connection 16 is a 'magnet' connection).

The male end part 18 is generally a projecting part for fitting into the female end part 22. The male end part 18 may for example be made of steel, aluminum or brass. The male end part 18 has an inner conduit 28. The inner conduit 28 has a diameter d. The diameter d may be uniform throughout the inner conduit 28. The male end part 18 is joined with the first pipe section 12 via the flexible pipe portion 20 (hence the connection 16 is 'flexible'). The flexible pipe portion 20 may also be referred to as a hose. The flexible pipe portion 20 is more flexible and bendable than the rigid first pipe section 12. The flexible pipe portion 20 may for example comprise or consist of a tube of braided steel wires, such as the Convoluted 316L SS Core Hose Stainless Braid provided by Swagelok. The flexible pipe portion 20 could alternatively be made of a plastic material that can cope with low temperatures without becoming brittle, such as the Parflex CNG Hose provided by Parker, for example. The flexible pipe portion 20 may for example be about 25-50 cm long.

The female end part 22 is attached to the second pipe section 14. Alternatively, the female end part 22 may be integrally formed with the second pipe section 14, i.e. the second pipe section 14 and the female end part 22 may be formed in one part. The female end part 22 may for example be made of steel, aluminum or brass. The female end part 22 may for example be cone-shaped, and at least partly correspond to the projecting male end part 18. The mouth 26 (or "base") of the cone-shaped female end part 22 may be wider than the maximum outer width or diameter of the male end part 18, to facilitate the docking. The female end part 22 also has an inner conduit 30. When the male and female end parts 18, 22 are coupled together, the inner conduits 28, 30 are aligned, forming a passage so that gas can pass from the first pipe section 12 to the second pipe section 14 of the gas venting line 10. The inner conduit 30 has a diameter D. The diameter D may be uniform throughout the inner conduit 30. The diameter D may be greater than the diameter d (D>d), so that the connection 16 does not separate if struck by high pressure gas. The diameter D may for example be about 15 mm, whereas the diameter d may be about 10 mm.

The magnetic means 24 may for example comprise a first permanent magnet 24a and a second permanent magnet 24b. The first and second permanent magnets 24a, 24b may be ring-shaped. The first permanent magnet 24a may be arranged in an annular recess 32a at the tip of the male end part 18, at the exit of the inner conduit 28. The second permanent magnet 24b may be arranged in an annular recess 32b at the bottom of the female end part 22, at the entrance of the inner conduit 30.

The first and second permanent magnets 24a, 24b are arranged such that in the connected state shown in FIGS. 1a-1b, the first and second permanent magnets 24a, 24b attract each other, in order to hold the first and second pipe sections 12, 14 together. The magnets 24a, 24b may also prevent gas leakage at the connection 16. In this connected state, a hollow internal channel is created so that gas can be vented through the gas venting pipe 10, in the direction indicated by the arrow in FIG. 1b. When a strong enough force is applied pulling the first and second pipe section 12, 14 apart, the connection 16 is released or disconnected (disconnected state of FIG. 2). The first and second pipe sections 12, 14 may again be interconnected by inserting the male end part 18 into the female end part 22.

It is appreciated that one of the first and second permanent magnets 24a, 24b could be replaced by an element of ferromagnetic material, such as iron. Also other configurations of the magnetic means 24 are possible. For example, one or more electromagnets could be used. Also, at least one of the ring-shaped magnets 24a, 24b, could be replaced by two or more separate magnets arranged in a ring.

Figure 3A:
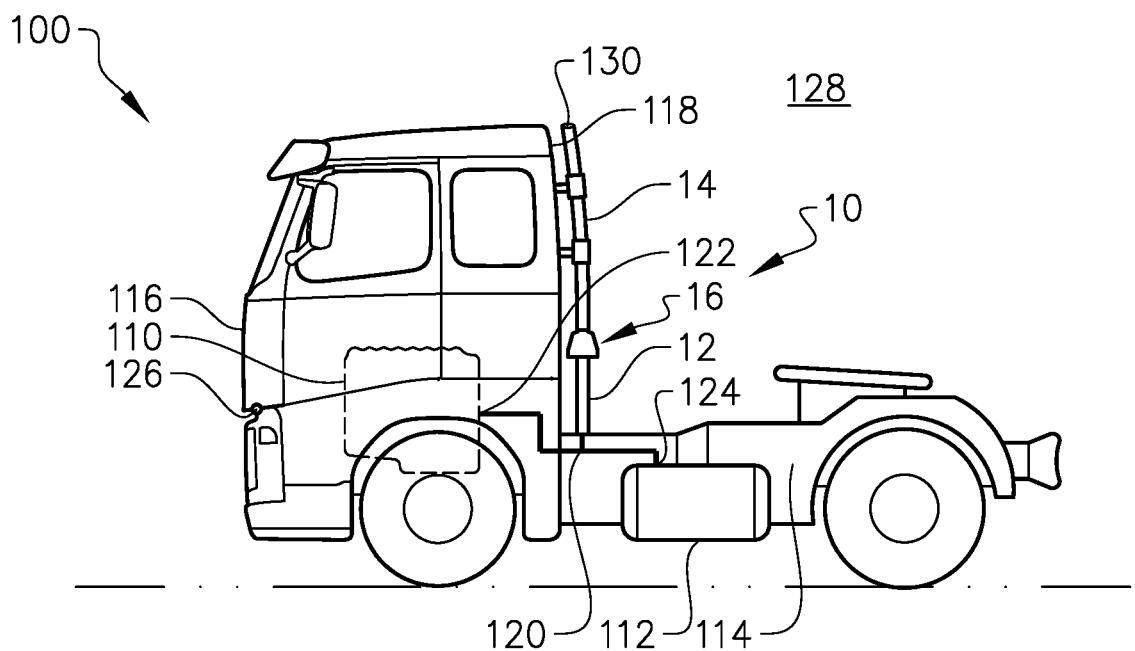
FIGS. 3a-b are schematic side views of a vehicle comprising a gas venting pipe according to an embodiment of the present invention.
Figure 3B:
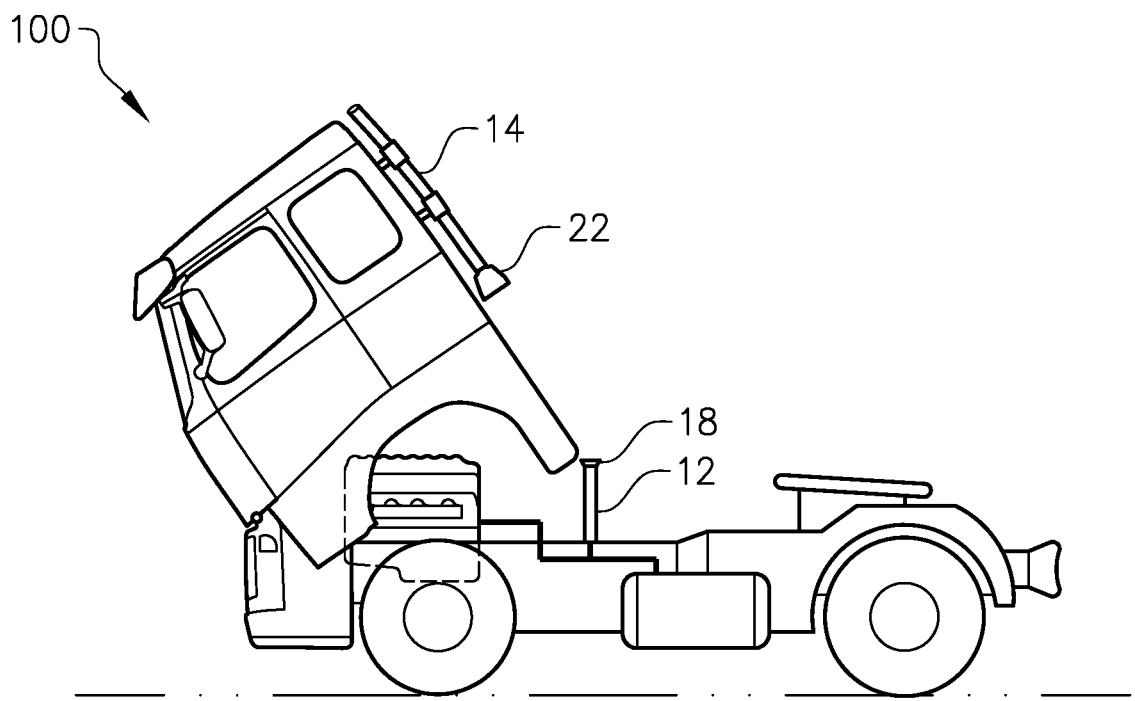

FIGS. 3a-b illustrate a vehicle 100 comprising a gas venting pipe 10 according to an embodiment of the present invention. The gas venting pipe 10 may be of the type disclosed in relation to FIGS. 1a-1b and 2. The vehicle 100 is a liquefied gas driven vehicle 100. This means that the vehicle 100 uses liquefied gas as fuel. The liquefied gas may be natural gas (LNG) or biogas (LBG), for example. The vehicle 100 may be a heavy-duty vehicle, such as a truck. The truck could be a tractor or a truck with some superstructure(s) such as a platform, a tanker, a freight compartment, etc.

The vehicle 100 comprises an engine 110, a fuel tank 112, a chassis 114, a forward tiltable cab 116, and the gas venting pipe 10.

The fuel tank 112 is adapted to contain liquefied gas. The fuel tank 112 may for example be mounted to the chassis 114. A vaporizer (not shown) may be used to turn the liquefied gas into a gas (gaseous state), and the engine 110 may use diesel to ignite the fuel/air mixture, like in Volvo FM MethaneDiesel. The engine 110 may have a left over gas outlet 122. Likewise, the fuel tank 112 may have a vapour withdrawal outlet 124, typically at the top of the fuel tank 112.

The forward tiltable cab 116 is pivotally mounted to the chassis 114, typically via a front hinge arrangement 126. The cab 116 also has a rear wall 118.

The gas venting pipe 10 comprises the first pipe section 12, the second pipe section 14, and the flexible magnet connection 16. The first pipe section 12 is mounted to the chassis 114, and the second pipe section 16 is mounted of the rear wall 118 of the cab 116. When the cab 116 is not tilted, the first and second pipe sections 12, 14 are normally interconnected and vertically arranged, as can be seen in FIG. 3a. The first pipe section 12 may here be referred to as a lower pipe section, and the second pipe section 14 may be referred to as an upper pipe section. Also, the mouth 26 of the female end part 22 is directed downwards. The gas venting pipe 10 may be placed next to a high air intake (not shown) of the vehicle 100.

The gas venting pipe 10 is generally adapted to vent left over gas from at least one of the engine 110 and the fuel tank 112 to the ambient 128. To this end, the gas venting pipe 10 has an opening 130, typically at the top of the second pipe member 16, for allowing the gas to go out. The opening 130 may be situated at least 1.8 m above the chassis 114, when the cab 116 is not tilted. Furthermore, the gas venting pipe 10 is in fluid communication with at least one of the engine 110 and the fuel tank 112. In particular, the gas venting pipe 10 may be in fluid communication with the left over gas outlet 122 of the engine 110 and/or with the vapour withdrawal outlet 124 of the fuel tank 112. In the illustrated embodiment, the gas venting pipe 10 is in fluid communication with both the engine 110 and the fuel tank 112. To this end, a branching 120 may be provided between the first pipe section 12 and the engine 110 and fuel tank 112, for "combining" gas from the engine 110 and the fuel tank 112. Alternatively, the gas venting pipe 10 may be in fluid communication with only one of the engine 110 and the fuel tank 112, in which case the vehicle 10 may comprise a second gas venting pipe (not shown) of the type disclosed herein, which second gas venting pipe is in fluid communication with the other one of the engine 110 and fuel tank 112.

In normal operation when the cab 116 is not tilted, the first and second sections 12, 14 of the gas venting pipe 10 are normally connected with each other (FIG. 3a), as discussed above. Left over gas may then be vented from the engine 110 and the fuel tank 112 to the ambient 128 via the gas venting pipe 10. But when the cab 116 is tilted forward as in FIG. 3b, the connection 16 is automatically released or disconnected, as the tilting of the cab 116 overcomes the attracting force of the magnetic means 24 of the connection 16. In this state, a gas suction device (not shown) can beneficially be attached to the now exposed male end part 18, for example during maintenance. When the cab 116 is tilted back, the connection 16 can simply be reconnected by inserting the male end part 18 into the female end part 22. Due to the flexible pipe portion 20, the connection 16 can also be disconnected even when the cab 116 is not tilted. An operator may for example manually pull the male end part 18 and/or the flexible pipe portion 20 downwards to disconnect the connection 16. This can be useful during maintenance performed when the cab 116 is not tilted.

It is to be understood that the present invention is not limited to the embodiments described above and illustrated in the drawings; rather, the skilled person will recognize that many changes and modifications may be made within the scope of the appended claims.

The invention claimed is:

1. A gas venting pipe for a vehicle having a forward tiltable cab, which gas venting pipe comprises:

a first pipe section mountable to a chassis of the vehicle;

a second pipe section mountable to a rear wall of the forward tiltable cab of the vehicle; and a flexible magnet connection adapted to releasably interconnect the first and second pipe sections, wherein the flexible magnet connection comprises a male end part joined with the first pipe section via a flexible pipe portion, a female end part attached to or integrally formed with the second pipe section, in which female end part the male end part at least partly fits, and magnetic means for holding the first and second pipe sections together, wherein the female end part is cone-shaped to form a mouth part which is wider than a maximum outer width of the male end part, wherein the magnetic means comprises a first magnet arranged in an annular recess at a tip of the male end part, and a second magnet arranged in an annular recess at a bottom of the female end part, wherein the male and female endparts each have an inner conduit, and wherein the diameter of the inner conduit of the female end part is greater than the diameter of the inner conduit of the male end part.

2. The gas venting pipe according to claim 1, wherein the first pipe section is rigid.

3. The gas venting pipe according to claim 2, wherein the flexible pipe portion comprises a tube of braided steel wires.

4. The gas venting pipe according to claim 2, wherein the male and female end parts each have an inner conduit, and wherein the diameter of the inner conduit of the female end part is greater than the diameter of the inner conduit of the male end part.

5. The gas venting pipe according to claim 1, wherein the flexible pipe portion comprises a tube of braided steel wires.

6. The gas venting pipe according to claim 5, wherein the male and female end parts each has an inner conduit, and wherein the diameter of the inner conduit of the female end part is greater than the diameter of the inner conduit of the male end part.

7. A liquefied gas driven vehicle, comprising:
an engine;
a fuel tank adapted to contain liquefied gas;
a chassis;
a forward tiltable cab pivotally mounted to the chassis, the cab having a rear wall; and
a gas venting pipe in fluid communication with at least one of the engine and the fuel tank, the gas venting pipe being adapted to vent left over gas from at least one of the engine and the fuel tank to the ambient,
wherein the gas venting pipe comprises a first pipe section mounted to the chassis, a second pipe section mounted to the rear wall of the forward tiltable cab, and a flexible magnet connection adapted to releasably interconnect the first and second pipe sections.

8. The liquefied gas driven vehicle according to claim 7, wherein the flexible magnet connection comprises a male end part joined with the first pipe section via a flexible pipe portion, a female end part attached to or integrally formed with the second pipe section, in which female end part the male end part at least partly fits, and magnetic means for holding the first and second pipe sections together.

9. The liquified gas driven vehicle according to claim 8, wherein the gas venting pipe is in fluid communication with both the engine and the fuel tank via a branching provided between said connection and the engine and fuel tank.

10. The liquified gas driven vehicle according to claim 8, wherein the gas venting pipe is in fluid communication with the engine, and wherein the vehicle further comprises another gas venting pipe in fluid communication with the fuel tank.

11. The liquefied gas driven vehicle according to claim 6, or wherein the gas venting pipe is in fluid communication with both the engine and the fuel tank via a branching provided between said connection and the engine and fuel tank.

12. The liquefied gas driven vehicle according to claim 6, wherein the gas venting pipe is in fluid communication with the engine, and wherein the vehicle further comprises another gas venting pipe in fluid communication with the fuel tank.

13. A method of venting gas from a liquefied gas driven vehicle having a forward tiltable cab, which method comprises:
providing a gas venting pipe in fluid communication with at least one of an engine and a fuel tank of the vehicle, wherein the gas venting pipe comprises a first pipe section mounted to a chassis of the vehicle, a second pipe section mounted to a rear wall of the forward tiltable cab, and a flexible magnet connection adapted to releasably interconnect the first and second pipe sections; and
venting gas from at least one of the engine and the fuel tank to the ambient via the gas venting pipe.

14. The method according to claim 13, wherein the flexible magnet connection comprises a male end part joined with the first pipe section via a flexible pipe portion, a female end part attached to or integrally formed with the second pipe section, in which female end part the male end part at least partly fits, and magnetic means for holding the first and second pipe sections together.

* * * * *